(12) United States Patent  
Urban

(10) Patent No.: US 8,364,041 B2
(45) Date of Patent: Jan. 29, 2013

(54) METHOD AND ARRANGEMENT FOR RECEIVING AN OPTICAL INPUT SIGNAL AND TRANSMITTING AN OPTICAL OUTPUT SIGNAL

(75) Inventor: Patryk Urban, Vallingby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 231 days.

(21) Appl. No.: 13/009,411

(22) Filed: Jan. 19, 2011

(65) Prior Publication Data

US 2012/0155879 A1 Jun. 21, 2012

(30) Foreign Application Priority Data

Dec. 20, 2010 (WO) .................. PCT/SE2010/051436

(51) Int. Cl.
*H04B 10/00* (2006.01)
*H04J 14/00* (2006.01)

(52) U.S. Cl. ............. 398/139; 398/67; 398/72; 398/135

(58) Field of Classification Search .................. 398/67, 398/72, 135, 139
See application file for complete search history.

(56) References Cited

U.S. PATENT DOCUMENTS

| 2010/0278535 | A1 | 11/2010 | Kim | |
|---|---|---|---|---|
| 2011/0091214 | A1* | 4/2011 | Cheng | 398/91 |
| 2011/0135309 | A1* | 6/2011 | Lee et al. | 398/79 |
| 2011/0222855 | A1* | 9/2011 | Kim et al. | 398/79 |
| 2012/0237220 | A1* | 9/2012 | Presi et al. | 398/50 |

FOREIGN PATENT DOCUMENTS

WO  WO 2010/025767 A1  3/2010

OTHER PUBLICATIONS

International Search Report, PCT/SE2010/051436, Aug. 31, 2011.
Liu et al. "A novel scheme for colorless ONU based on Michael Interferometer at Radio frequency" Optical Transmission Systems, Switching, and Subsystems VII, edited by Dominique Chiaroni, Proc. of SPIE-OSA-IEEE Asia Communications and Photonics, SPIE vol. 7632, 76322S, pp. 1-6, 2009 SPIE-OSA-IEEE, Nov. 2, 2009.
Urban et al.: "Interferometric crosstalk reduction in an RSOA-based WDM passive optical network", Journal of Lightwave Technology, vol. 27, nr 22, pp. 4943-4953, Nov. 15, 2009.

* cited by examiner

*Primary Examiner* — Nathan Curs
(74) *Attorney, Agent, or Firm* — Myers Bigel Sibley & Sajovec, P.A.

(57) ABSTRACT

The present invention relates to a transceiver unit in a PON, Passive Optical Network, for receiving an optical input signal and transmitting an amplitude modulated optical output signal. Further, the present invention relates to a method in a transceiver unit for receiving an optical input signal and transmitting an amplitude modulated optical output signal.

10 Claims, 6 Drawing Sheets

METHOD AND ARRANGEMENT FOR RECEIVING AN OPTICAL INPUT SIGNAL AND TRANSMITTING AN OPTICAL OUTPUT SIGNAL

CROSS-REFERENCE TO RELATED APPLICATIONS

This is a 35 USC §111 application claiming priority under 35 USC §119 and §120 to PCT International Application No. PCT/SE2010/051436, filed on Dec. 20, 2010, the disclosure of which is incorporated by reference herein in its entirety.

TECHNICAL FIELD

The present invention relates to a method and an arrangement for receiving an optical input signal and transmitting an optical output signal.

BACKGROUND

A PON (Passive Optical Network) is a point-to-multipoint optical network architecture. The PON may for instance be a Fiber to the Premises, Fiber to the Curb, Fiber to the Cabinet or Fiber to the Building network. Unpowered optical splitters are used to enable a single optical fiber to serve multiple sites.

A PON consists of an OLT (Optical Line Terminal) at the service provider's CO (Central Office) and a number of ONUs (Optical Network Units) near end users. The PON configuration reduces the number of optical fibers required and cost compared with point to point architectures. Downstream signals are transmitted to and upstream signals are received from each premise sharing a single fiber by using a multiple access protocol such as TDMA, Time Division Multiple Access or WDM, Wavelength Division Multiplexing.

There are several well-established standards for PONs, like GPON. New technologies are also being developed which increase the available bandwidth per user. Development of these new technologies is among others driven by the never-ending bandwidth thirst for large volume data transmissions and HDTV-streaming. One of these new solutions is hybrid WDM/TDM-PON systems which use both WDM and TDM as multiple access protocol. WDM/TDM-PON systems enable a higher number of users to be connected to one access network infrastructure. There have been several approaches towards WDM/TDM-PON solutions. Some of them include tunable elements at the ONU, which is still an expensive technology in the access network. A great potential has been discovered in RSOA, Reflective Semiconductor Optical Amplifiers, and REAM, Reflective Electro Absorption Modulators. Although they are sufficiently wavelength-agnostic, they still have serious drawbacks. RSOA has a limited modulation bandwidth (max 2.5 GHz) and the REAM suffers from very high intrinsic loss and requires an optical amplifier.

There is therefore a need for an improved solution for WDM/TDM-PON, which solution solves or at least mitigates at least one of the above mentioned problems.

SUMMARY

As mentioned above there have been several approaches towards WDM/TDM-PON solutions.

For some solutions available today it is necessary with tunable elements at the ONU, which is still an expensive technology in the access network. Other solutions utilize RSOA and REAM which have serious drawbacks. An object of the present invention is therefore to provide methods and arrangements to solve or at least mitigate at least one of the above mentioned problems.

The above stated object is achieved by means of a transceiver unit for receiving an optical input signal and transmitting an amplitude modulated optical output signal and a method in a transceiver unit for receiving an optical input signal and transmitting an amplitude modulated optical output signal.

In accordance with a first aspect of the present invention a transceiver unit for receiving an optical input signal and transmitting an amplitude modulated optical output signal is provided. The transceiver unit comprises a first coupler configured to power split the optical input signal comprising a modulated optical signal and an unmodulated optical signal to a receiver and to a second coupler. The receiver is configured to convert the modulated optical signal and the unmodulated optical signal to an electrical output signal. The second coupler being configured to split the optical input signal from the first coupler to a first Semiconductor Optical Amplifier, SOA, and a second SOA, the first SOA being configured to saturation to erase amplitude modulation of the optical input signal. The transceiver unit further comprises phase modulation means connected to the first SOA configured to phase modulate a first saturated optical input signal from the first SOA based on data information to be transferred. Further the transceiver unit comprises first reflection means connected to the phase modulation means configured to reflect a phase modulated first saturated optical input signal from the phase modulation means back into the phase modulation means. The second SOA is configured to saturation to erase amplitude modulation of the optical input signal from the second coupler. Yet further the transceiver unit comprises second reflection means connected to the second SOA and configured to reflect a second saturated optical input signal from the second SOA back into the second SOA. The second SOA is further configured to further erase amplitude modulation of the second saturated optical input signal, and the first SOA is further configured to further erase amplitude modulation of the phase modulated first saturated optical input signal. The second coupler is yet further configured to create the amplitude modulated optical output signal by adding a first output signal from the first SOA and a second output signal from the second SOA.

In accordance with a second aspect of the present invention a method in a transceiver unit for receiving an optical input signal and transmitting an amplitude modulated optical output signal is provided. The method comprises the steps power splitting the optical input signal comprising a modulated optical signal and an unmodulated optical signal to a receiver and to a second coupler; converting the modulated optical signal and the unmodulated optical signal to an electrical output signal in the receiver; splitting the optical input signal in the second coupler to a first Semiconductor Optical Amplifier, SOA, and a second SOA; erasing amplitude modulation of the optical input signal in the first SOA; phase modulating a first saturated optical input signal from the first SOA based on data information to be transferred; reflecting a phase modulated first saturated optical input signal from the phase modulation means back into the phase modulation means; erasing amplitude modulation of the optical input signal in the second SOA; reflecting a second saturated optical input signal from the second SOA back into the second SOA; further erasing amplitude modulation of the second saturated optical input signal in the second SOA; further erasing amplitude modulation of the phase modulated first saturated optical input in the first SOA; creating the amplitude modulated optical output signal by adding a first output signal from the first SOA and a second output signal from the second SOA.

An advantage of embodiments of the present invention is that it provides a significant increase in cost-efficiency since a single type of transceiver unit can be deployed at both OLT and ONT.

A further advantage of embodiments of the present invention is that it enables large electric bandwidth and high optical extinction ratio.

Another advantage of embodiments of the present invention is that it increases robustness against RBS, Rayleigh Backscattering, thanks to saturation in the transceiver unit.

A further advantage of embodiments of the present invention is increased power budget due to saturation in the transceiver unit.

Yet a further advantage of embodiments of the present invention is centralized filtering functionality.

Another advantage with embodiments of the present invention is centralized light generation.

Another advantage with embodiments of the present invention is cost-flexibility due to the free choice of the type of CLS, Centralized Lightwave Source. Yet further advantages with embodiments of the present invention are passive ODN, Optical Distribution Network, shared infrastructure, large optical bandwidth, large number of users.

Further features of embodiments of the present invention will become apparent when reading the following detailed description in conjunction with the drawings.

DETAILED DESCRIPTION

Figure 1:
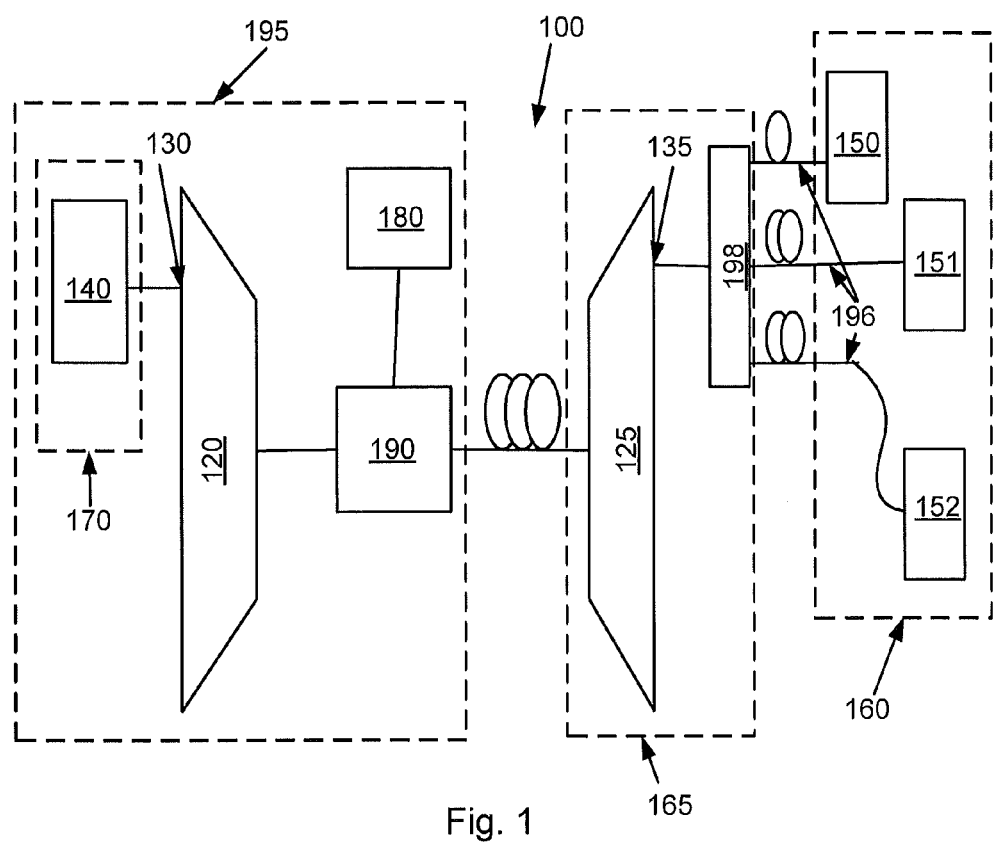
FIG. 1 is a schematic block diagram of system 100 in which the invention can be implemented.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

FIG. 1 is a schematic block diagram of system 100 in which the invention can be implemented. The system 100 comprises several TDM-PON-links (not shown). Each TDM-PON-link has two dedicated wavelengths for bidirectional transmission. By means of cyclic nature of the wavelength multiplexers 120, 125 the wavelength channels are transmitted through a single port 130, 135. The cyclic natures of the multiplexers 120, 125 are based on AWG, Arrayed Waveguide Grating. The two channels are coupled with a FSR, Free Spectral Range, of an AWG.

Each TDM-PON-link comprises two transceiver units 140, 150. In FIG. 1 there are also two other transceiver units 151, 152 illustrated that belong to other TDM-PON-links. The transceiver units 140, 150 according to the present invention is colorless in the sense that they can receive and transmit any wavelength channel since there is no optical filter mechanism involved in the receiver part (not shown) nor the transmitter part (not shown) of the transceiver units 140, 150. The transceiver units 140, 150 neither require dedicated laser sources since they use reflection mechanism (not shown) for transmission. The receiver, transmitter and reflection mechanism in the transceiver units 140, 150 will be described in detailed in relation to FIG. 4.

The transceiver units 140, 150 can be applied in both the ONU-end 160 and the OLT-end 170 of the optical access network link. The transceiver units 140, 150 according to the present invention enable cost-efficient wavelength separated downstream and upstream transmission. Transmission and reception of high bit-rate amplitude-modulated wavelength channels are therefore enabled with the transceiver units 140, 150 according to the present invention. The transceiver units 140, 150 are therefore suitable for high split-ratio hybrid WDM/TDM-PON systems. The optical GS (Gain Saturation), as will be described further down, in the transceiver units 140, 150 induced by the signal reflected at an end-facet (not shown) of the transceiver units 140, 150 result in that the system 100 does not suffer from a tight optical budget as most of the high split-ratio systems, This GS also provides for higher tolerance of the transmission against amplitude noise induced by intrachannel-crosstalk due to e.g. RBS, Rayleigh Backscattering, which is achieved by amplitude noise erasure.

The system illustrated in FIG. 1 also comprises a CLS 180 (Centralized Lightwave Source) at a CO 195 (Central Office). The CLS 180 at the CO 195 feeds a Seeder Unit 190 with a set of CW channels (not shown). A power splitter 198 splits wavelength channels into drop fibres 196.

Figure 2:
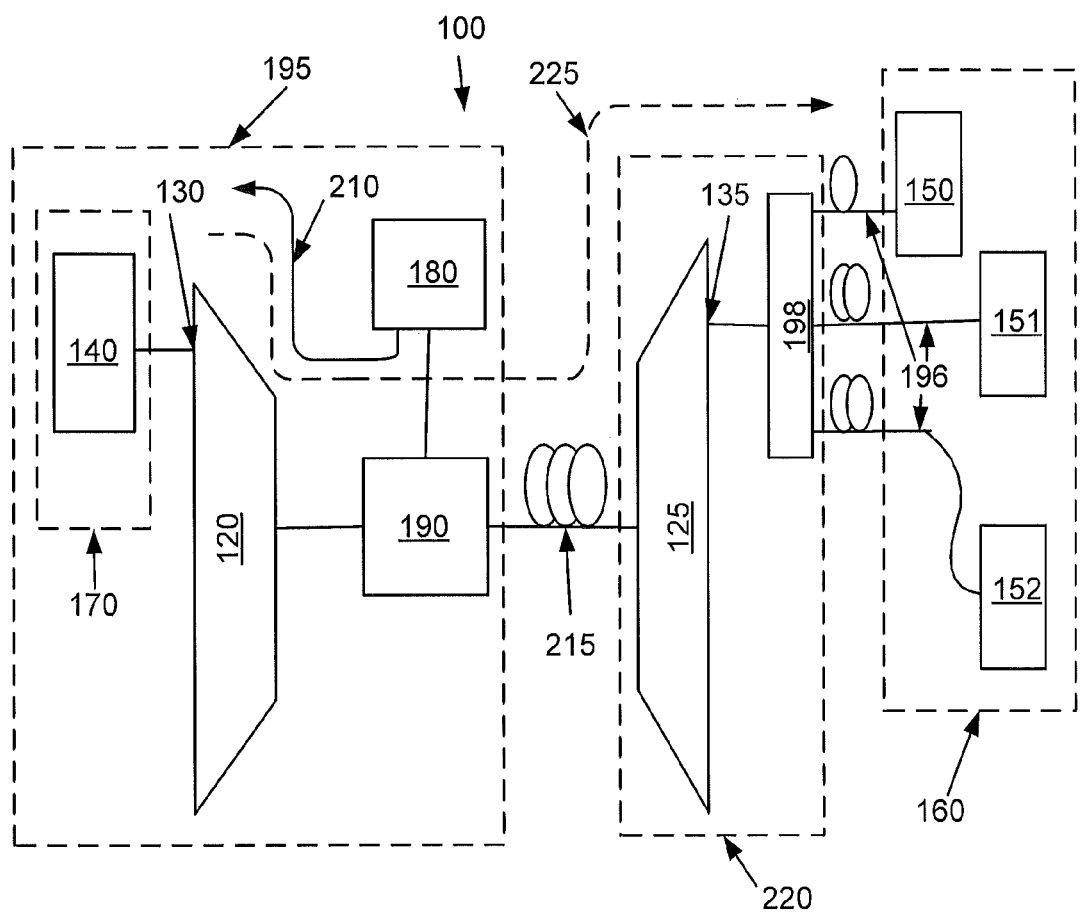
FIG. 2 is a schematic block diagram of the system 100 in which downstream transmission using the transceiver units according to the present invention are illustrated.

FIG. 2 is a schematic block diagram of the system 100 in which downstream transmission using the transceiver units 140, 150 according to the present invention are illustrated. First downstream transmission from the CO 195 to the ONU 160 will be described. The CLS 180 at the CO 195 feeds the SU 190 with a set of CW channels (not shown). By means of filtering means (not shown) at the SU 190 some of the CW channels are directed via wavelength multiplexer 120 towards the transceiver unit 140 at the CO 195. These CW channels are illustrated by a solid line 210.

As will be described further down, the transceiver unit 140 according to the present invention amplifies, amplitude-modulates and reflects part of power from a single wavelength channel. The remaining CW power at the transceiver unit 140 is directed into the photo detector (not shown) and is suppressed by means of a DC-block (not shown). The downstream signal 225 is then transmitted via wavelength multiplexer 120, SU 190, and feeder fiber 215 into a remote node 220. The wavelength multiplexer 125 and power splitter 198 in the remote mode 220 split the downstream signal 225 into drop fibres 196.

The drop fibres 196 provide the downstream signal 225 to the ONUs 160 in which the transceiver units 150 are located. The transceiver unit 150 in the ONU 160 is a same transceiver unit as the transceiver unit 140 in the OLT 170. As will be described further down some power of a modulated part of the downstream signal 225 is directed to a photo detector (not shown) in the transceiver unit 150. The remaining power is directed to a transmitter part (not shown) of the transceiver unit 150 and is further referred to as upstream inter channel crosstalk. The upstream inter channel crosstalk (not shown) is accompanying an upstream data signal (not shown) from the transceiver unit 150. The upstream inter channel crosstalk is later on discarded in the SU 190.

Figure 3:
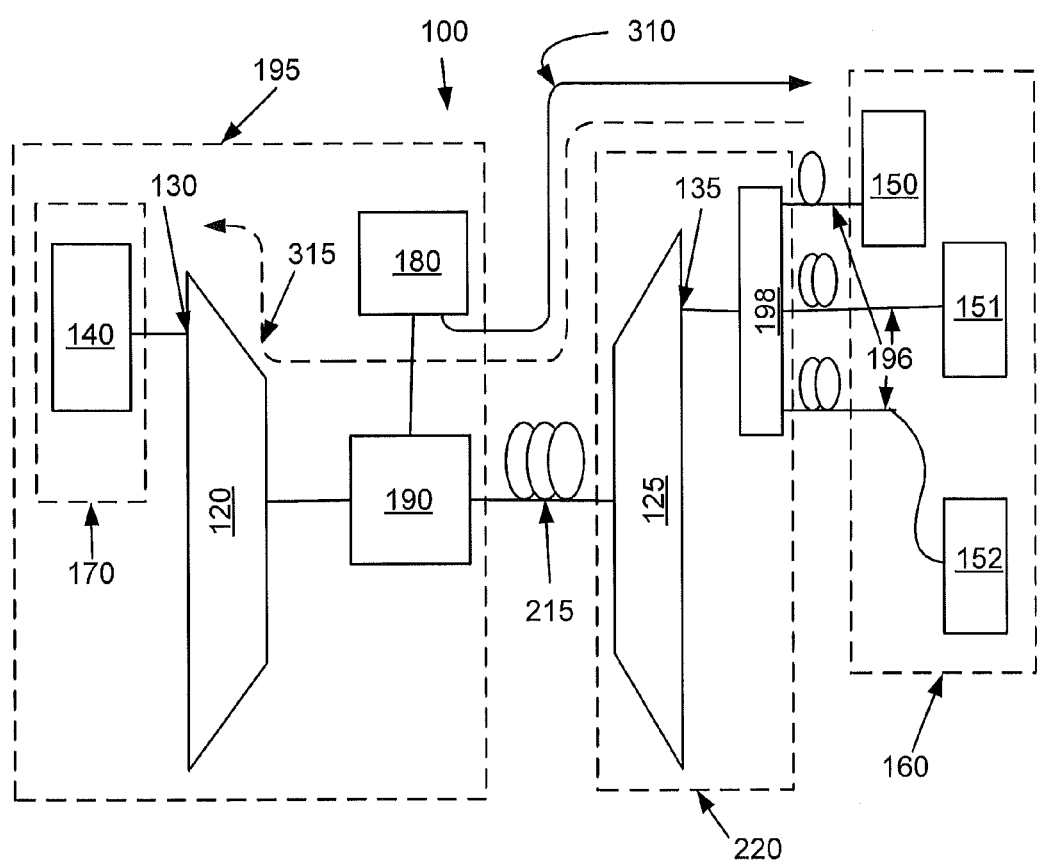
FIG. 3 is a schematic block diagram of the system 100 in which upstream transmission using the transceiver units according to the present invention are illustrated.

In FIG. 3 upstream transmission in the system 100 is illustrated. By means of filtering means (not shown) at the SU 190 some of the CW channels are coupled from CLS 180 directly into the feeder fibre 215. The RN 220 distributes the wavelength channels 310 towards a number of transceiver units 150, 151 and 152. Similarly as for the transceiver unit 140 in the CO 195, in the transceiver unit 150 an optical input signal (not shown) is divided. Part of the optical input signal goes into a photo detector (not shown), where constant-amplitude photocurrents in the optical input signal is discarded by means of DC-block. As will be described further down the other part is amplified, amplitude-modulated, reflected and sent back towards the transceiver unit 140 at the CO 195 via drop fiber 196, RN 220, feeder fibre 215 and the SU 190. This is illustrated by the dashed line 315. In the transceiver unit 140 some power of the modulated signal is directed the photo detector (not shown) in the transceiver unit 140 and the reaming power goes to a transmitter part (not shown) of the transceiver unit 140 and is further referred to as downstream inter channel crosstalk accompanying the downstream data signal. The downstream inter channel crosstalk is later on discarded in the SU 190.

Figure 4:
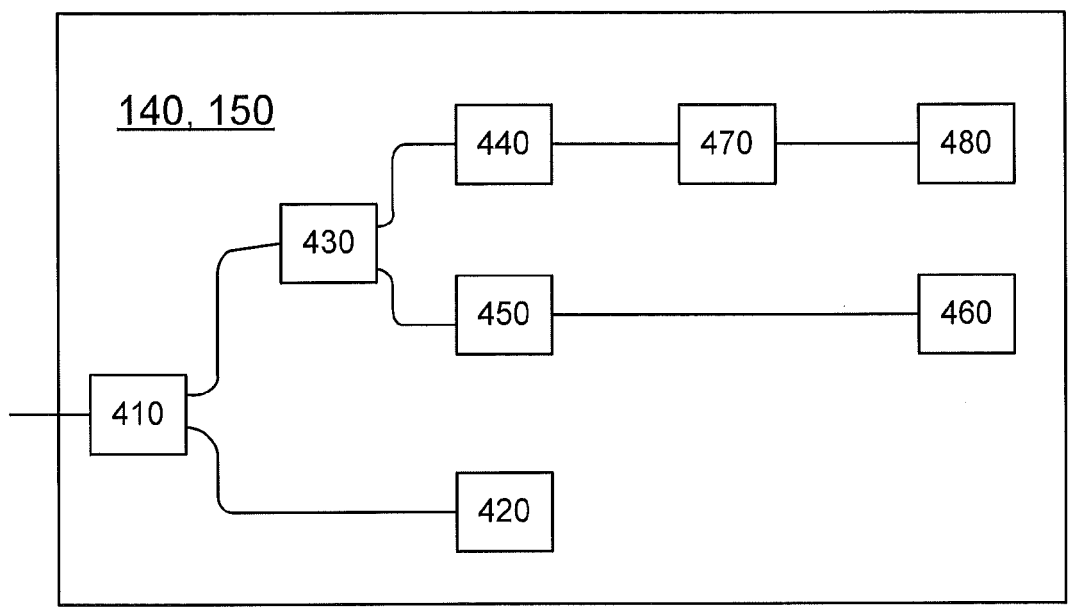
FIG. 4 illustrates a schematic block diagram of a transceiver unit 140, 150 according to the present invention.

FIG. 4 illustrates a schematic block diagram of a transceiver unit 140, 150 according to the present invention for receiving an optical input signal and transmitting an amplitude modulated optical output signal. As shown in FIG. 4, the transceiver unit 140, 150 comprises a first coupler 410 configured to power split the optical input signal comprising a modulated optical signal and an unmodulated optical signal to a receiver 420 and to a second coupler 430. The receiver 420 is configured to convert the modulated optical signal and the unmodulated optical signal to an electrical output signal. The second coupler 430 is configured to split the optical input signal from the first coupler 410 to a first Semiconductor Optical Amplifier, SOA, 440 and a second SOA 450. The first SOA 440 is configured to saturation to erase amplitude modulation of the optical input signal. In an exemplary embodiment of the transceiver unit 140, 150 according to the present invention the SOA is configured to saturation with a constant bias current. As illustrated in FIG. 4, the transceiver unit 140, 150 further includes phase modulation means 470 connected to the first SOA 440.

The phase modulation means 470 is configured to phase modulate a first saturated optical input signal from the first SOA 440 based on data information to be transferred. Further, the transceiver unit 140, 150 comprises first reflection means 480 connected to the phase modulation means 470 configured to reflect a phase modulated first saturated optical input signal from the phase modulation means 470 back into the phase modulation means 470. In an exemplary embodiment of the transceiver unit 140, 150 in accordance with the present invention the phase modulated first saturated optical input signal from the reflection means 480 is further phase modulated as it again passes the phase modulation means 470. In an exemplary embodiment of the transceiver unit 140, 150 in accordance with the present invention the first saturated optical input signal undergoes phase modulation according to the bit pattern logic "zero" corresponds to a π-shift. The first reflection means 480 may be loop-mirrors which introduce lower loss than a regular reflective facet. The second SOA 450 which receives the optical input signal from the second coupler 430 is configured to saturation to erase amplitude modulation of the optical input signal. Furthermore in accordance with the present invention the transceiver unit 140, 150 comprises second reflection means 460 connected to the second SOA 450. The second reflection means 460 is configured to reflect a second saturated optical input signal from the second SOA 450 back into the second SOA 450. The second SOA 450 is further configured to further erase amplitude modulation of the second saturated optical input signal. The first SOA 440 is also being further configured to further erase amplitude modulation of the phase modulated first saturated optical input signal. The modulated optical output signal is created by the second coupler 430 which is further configured to do so by adding a first output signal from the first SOA 440 and a second output signal from the second SOA 450. Since the second output signal from the second SOA 450 has not experiences any phase modulation, the amplitude of the modulated optical output signal is changed according with phase differences in relation to the signal from the first SOA 440. Low amplitude if the relative phase difference reaches π and high amplitude if the relative phase difference is 0.

In an exemplary embodiment of the transceiver unit 140, 150 the transceiver unit is integrated on a single chip component which enables cost efficient mass production of the transceiver unit 140, 150.

Figure 5:
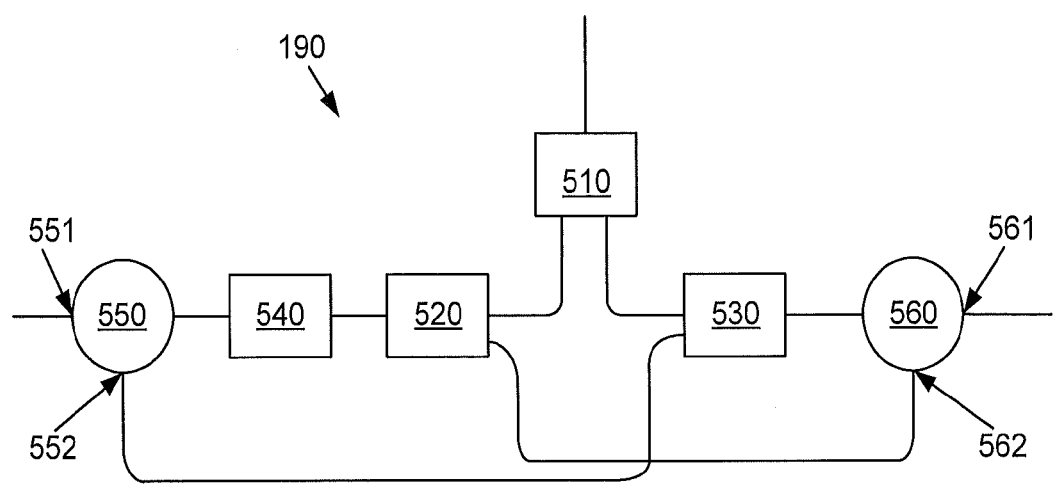
FIG. 5 illustrates a schematic block diagram of the seeder unit 190 in the system 100.

Referring to FIG. 5 there is illustrated a simplified block diagram of the seeder unit 190 in the system 100. As illustrated in FIG. 5, the seeder unit 190 comprises three optical band-pass filters 510, 520 and 530. Furthermore the seeder unit 190 comprises a fixed attenuator 540, and two circulators 550, 560. The optical band-pass filters 510 interfaces the CLS 180. The CLS 180 may be a spectrally sliced broadband source or a comb of WDM lasers. The optical band-pass filters 510 splits the spectrum of the incoming WDM signal into two parts, DS seeds and US seeds. The DS seeds are directed into the optical band-pass filter 520 where the DS seeds are combined with US data signals and are further transmitted via port 551 of the circulator 550 towards the transceiver unit 140. The DS after modulation in the transceiver unit 140 comes back via the same port 551 and by-pass from port 552 in the circulator to the optical band-pass filter 530 where DS after modulation combines with US seeds coming from the optical band-pass filter 510. Further on the modulated DS and unmodulated US seeds leave the SU 190 via port 561 of the circulator 560. The US signals coming into the SU 190 via port 561 by-pass from port 562 of the circulator 560 to the optical band-pass filter 520 and leave the SU 190 together with DS seeds.

If RBS, Rayleigh Backscattering Scattering, is still an issue in the system 100 the circulator 560 can be moved out of the SU 190 to the RN 220 providing a double fiber transmission in the feeder fiber 215.

RX sensitivity is defined as the estimated minimum power measured at the input to the transceiver unit 140, 150 for error-free transmission. Modulator sensitivity is defined as the estimated minimum power measured at the input to the transceiver unit 140, 150 for the optimum performance of the modulator. In order to maintain similar (optimum) performance of all transceiver units 140, 150 the optical power levels injected to all transceiver units 140, 150 are equalized. This is achieved by the attenuator 540 applied in the SU 190, which adjusts the transceiver unit 140, 150 input power of the CW channels. This extra attenuation corresponds to the loss in the ODN 165 diminished by the loss in the multiplexer 120 in the CO 195. It is important that the CW power is higher than the data signal power at the input of the transceiver unit 140, 150 in order to reduce the influence of XGM, Cross Gain Modulation in the SOA 140, 150. The higher remaining power budget for US transmission can be accommodated to balance the power penalties due to RBS, which may have influence in the US path. The remaining power budget can be even improved if the input power to the SU 190 is increased.

Figure 6:
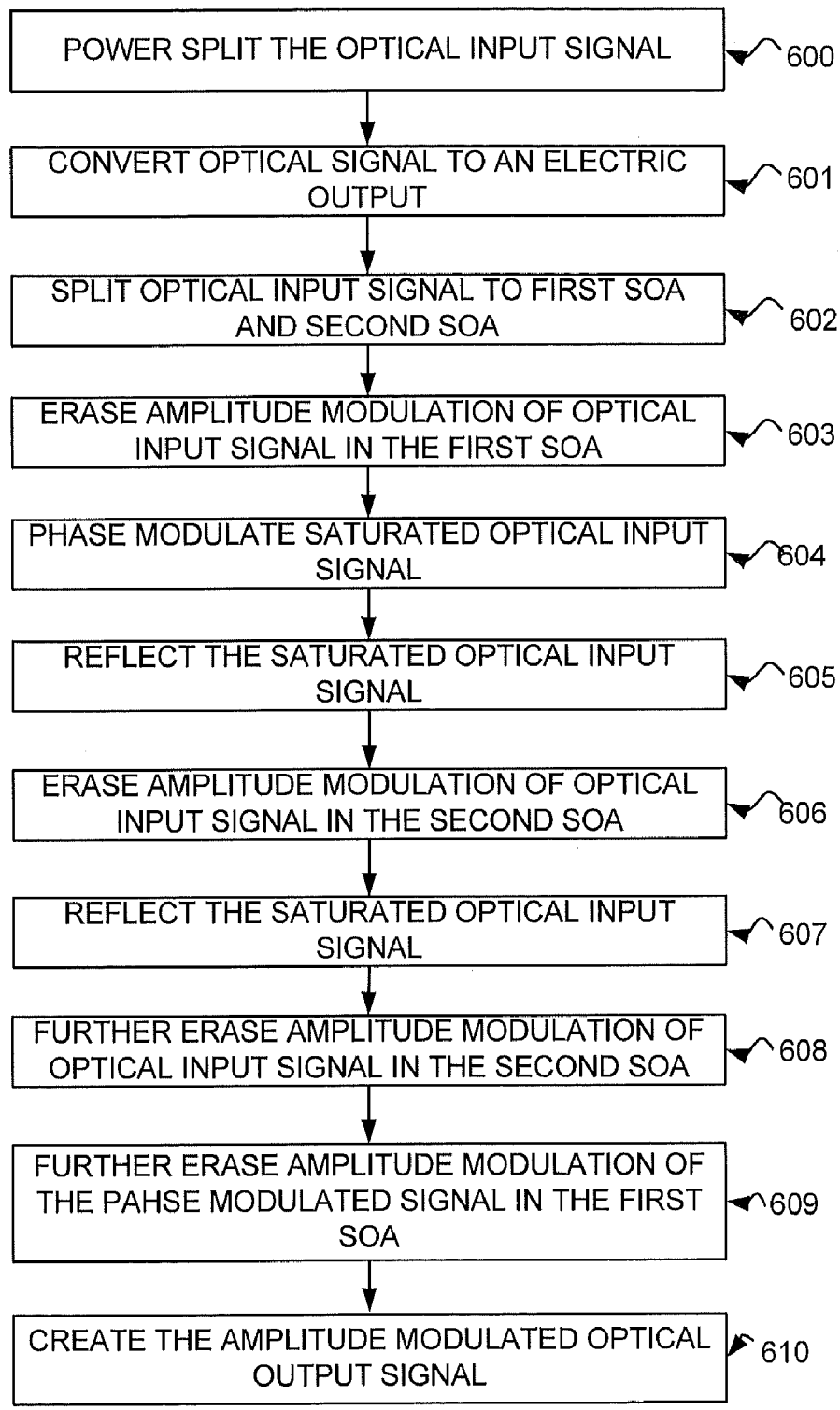
FIG. 6 illustrated a flowchart of a method according to the present invention.

Referring to FIG. 6 there is illustrated a flowchart of a method in a transceiver unit 140, 150 for receiving an optical input signal and transmitting an amplitude modulated optical output signal. In a step 600 the optical input signal comprising a modulated optical signal and an unmodulated optical signal is power splitted to a receiver 120 and to a second coupler 130. In a step 601 the modulated optical signal and the unmodulated optical signal are converted to an electrical output signal in the receiver. In a step 602 the optical input signal is splitted in the second coupler 130 to a first Semiconductor Optical Amplifier, SOA, 140 and a second SOA 150. In a step 603 amplitude modulation of the optical input signal is erased in the first SOA 140. In a step 604 a first saturated optical input signal from the first SOA 140 is phase modulated based on data information to be transferred. In a step 605 a phase modulated first saturated optical input signal is reflected from the phase modulation means 170 back into the phase modulation means 170. In a step 606 amplitude modulation of the optical input signal is erased in the second SOA 150 In a step 607 a second saturated optical input signal is reflected from the second SOA 150 back into the second SOA 150. In a step 608 amplitude modulation of the second saturated optical input signal is further erased in the second SOA 150. In a step 609 amplitude modulation of the phase modulated first saturated optical input is further erased in the first SOA 140. In a step 610 the amplitude modulated optical output signal is created by adding a first output signal from the first SOA 140 and a second output signal from the second SOA 150.

The invention claimed is:

1. A transceiver unit for receiving an optical input signal and transmitting an amplitude modulated optical output signal, comprising:

a first coupler;

a receiver connected to said first coupler;

a second coupler connected to said first coupler;

a first Semiconductor Optical Amplifier (SOA) connected to said second coupler; and a second SOA connected to said second coupler, wherein said first coupler is configured to power split said optical input signal comprising a modulated optical signal and an unmodulated optical signal to said receiver and to said second coupler, wherein said receiver is configured to convert said modulated optical signal and said unmodulated optical signal to an electrical output signal, wherein said second coupler is configured to split said optical input signal from said first coupler to said first SOA and said second SOA, said first SOA being configured to saturation to erase amplitude modulation of the optical input signal, and wherein said transceiver unit further comprises:

a phase modulation circuit connected to said first SOA and configured to phase modulate a first saturated optical input signal from said first SOA based on data information to be transferred;

a first reflection circuit connected to the phase modulation circuit and configured to reflect a phase modulated first saturated optical input signal from the phase modulation circuit back into said phase modulation circuit, wherein said second SOA is configured to saturation to erase amplitude modulation of the optical input signal from the second coupler; and a second reflection circuit connected to said second SOA and configured to reflect a second saturated optical input signal from the second SOA back into said second SOA, wherein said second SOA is further configured to erase amplitude modulation of said second saturated optical input signal, and wherein said first SOA is further configured to erase amplitude modulation of the phase modulated first saturated optical input signal, and wherein said second coupler is further configured to create the amplitude modulated optical output signal by adding a first output signal from said first SOA and a second output signal from the second SOA.

2. A transceiver unit according to claim 1, wherein said transceiver unit is used in a TDM/WDM (Time Division Multiplexing/Wavelength Division Multiplexing) system.

3. A transceiver unit according to claim 1, wherein said transceiver unit is applied in both ends of an optical access network link.

4. A transceiver unit according to claim 1, wherein said transceiver unit is arranged on a single chip.

5. A transceiver unit according to claim 1, wherein said receiver is further configured to DC (Direct Current) block the unmodulated optical signal.

6. A method in a transceiver unit for receiving an optical input signal and transmitting an amplitude modulated optical output signal, the method comprising:

power splitting said optical input signal comprising a modulated optical signal and an unmodulated optical signal to a receiver and to a second coupler, converting said modulated optical signal and an said unmodulated optical signal to an electrical output signal in said receiver;

splitting said optical input signal in said second coupler to a first Semiconductor Optical Amplifier (SOA) and to a second SOA;

erasing amplitude modulation of the optical input signal in the first SOA;

phase modulating a first saturated optical input signal from said first SOA based on data information to be transferred in a phase modulation circuit;

reflecting a phase modulated first saturated optical input signal from the phase modulation circuit back into said phase modulation circuit;

erasing amplitude modulation of the optical input signal in the second SOA;

reflecting a second saturated optical input signal from the second SOA back into said second SOA;

erasing amplitude modulation of the second saturated optical input signal in the second SOA;

erasing amplitude modulation of the phase modulated first saturated optical input in the first SOA; and creating the amplitude modulated optical output signal by adding a first output signal from the first SOA and a second output signal from the second SOA.

7. A method according to claim 6, wherein said transceiver unit is used in a TDM/WDM-system, Time Division Multiplexing/Wavelength Division Multiplexing.

8. A method according to claim 6, wherein said transceiver unit is applied in both ends of an optical access network link.

9. A method according to claim 6, wherein said transceiver unit is arranged on a single chip.

10. A method according to claim 6, wherein said converting further comprises DC-blocking the unmodulated optical signal.

UNITED STATES PATENT AND TRADEMARK OFFICE
CERTIFICATE OF CORRECTION

PATENT NO. : 8,364,041 B2  
APPLICATION NO. : 13/009411  
DATED : January 29, 2013  
INVENTOR(S) : Urban Page 1 of 1

It is certified that error appears in the above-identified patent and that said Letters Patent is hereby corrected as shown below:

Title Page

Item (75), under "Inventor", in Column 1, Line 1, delete "Vallingby" and insert -- Vällingby --, therefor.

Item (56), under "OTHER PUBLICATIONS", in Column 2, Line 10, delete "nr" and insert -- no. --, therefor.

In the Drawings

In Fig. 6, Sheet 6 of 6, for Tag "609", Line 2, delete "PAHSE" and insert -- PHASE --, therefor.

In the Claims

In Column 8, Line 29, in Claim 6, delete "coupler," and insert -- coupler; --, therefor.

Signed and Sealed this  
Eleventh Day of June, 2013

Teresa Stanek Rea  
*Acting Director of the United States Patent and Trademark Office*